United States Patent
Ziegler (12)

(10) Patent No.: US 8,046,569 B2
(45) Date of Patent: Oct. 25, 2011

(54) PROCESSING ELEMENT HAVING DUAL CONTROL STORES TO MINIMIZE BRANCH LATENCY

(75) Inventor: Michael L. Ziegler, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 11/796,810

(22) Filed: Apr. 30, 2007

(65) Prior Publication Data

US 2008/0270773 A1    Oct. 30, 2008

(51) Int. Cl.
*G06F 9/00* (2006.01)
(52) U.S. Cl. ...................................................... 712/235
(58) Field of Classification Search .................. 712/235
See application file for complete search history.

(56) References Cited

U.S. PATENT DOCUMENTS

| | | | | |
|---|---|---|---|---|
| 5,903,750 | A * | 5/1999 | Yeh et al. | 712/236 |
| 5,961,637 | A * | 10/1999 | Sturges et al. | 712/235 |
| 6,643,770 | B1 * | 11/2003 | Kacevas | 712/235 |
| 6,976,156 | B1 * | 12/2005 | Nguyen | 712/237 |

OTHER PUBLICATIONS

Hennessy, John L., Patterson, David A. "Computer Organization and Design: The hardware/software interface" Morgan Kaufmann Publishers, $2^{nd}$ edition, Aug. 1997, pp. 449-465.*
Hennessy, John L., Patterson, David A. "Computer Organization and Design: The hardware/software interface" Morgan Kaufmann Publishers, 2nd edition, Aug. 1997, pp. 449-470.*

* cited by examiner

*Primary Examiner* — Jacob Petranek

(57) ABSTRACT

Embodiments involve an embedded processing element that fetches at least two possible next instructions (control words) in parallel in one cycle, and executes one of them during the following cycle based on the result of a conditional branch test. Embodiments reduce or avoid branch penalties (zero penalty branches).

20 Claims, 3 Drawing Sheets

TEST CONDITION ENCODINGS:

| 0000 | TRUE | 1000 | ALU TEST + LU TEST |
| 0001 | FALSE | 1001 | $\overline{\text{ALU TEST + LU TEST}}$ |
| 0010 | ALU TEST | 1010 | ALU TEST • LU TEST |
| 0011 | $\overline{\text{ALU TEST}}$ | 1011 | $\overline{\text{ALU TEST • LU TEST}}$ |
| 0100 | LU TEST | 1100 | P0 |
| 0101 | $\overline{\text{LU TEST}}$ | 1101 | P0 |
| 0110 | RESERVED | 1110 | P1 |
| 0111 | RESERVED | 1111 | P2 |

PROCESSING ELEMENT HAVING DUAL CONTROL STORES TO MINIMIZE BRANCH LATENCY

TECHNICAL FIELD

This application relates in general to computers, and in specific to systems and methods having dual control stores to minimize branch latencies.

BACKGROUND OF THE INVENTION

Handling of packets in a network is similar to execution of a program. In a computer program, the next instruction that is to be executed may depend on the results of the execution of the current instruction. For example, a conditional branch instruction may cause one instruction to be executed if a condition is equal to a first value, while a different instruction may be executed if the condition is equal to a second value. Similarly, the destination of a packet may be one location if a field of the packet is a first value, or may be another location if the field of the packet is a second value. A long sequence of such dependent tests may be required to determine the destination of a packet. Consequently, network packet handling is branch dependent.

Thus, network packet handling, including network packet parsing, can be classified as "branch intensive," meaning that the time to solution for that task is dominated by the speed with which a required sequence of conditional branches can be executed. Most processors experience at least some penalty each time a conditional branch is executed, due to the fact that certain operations that might otherwise be overlapped cannot achieve that parallelism when a branch is taken. For example, a processor may typically perform the logical and arithmetic operations required for one instruction while fetching the next instruction from memory. This overlap of functions is not possible if the address used to fetch the next instruction is determined by the logical and arithmetic functions performed by the immediately previous instruction. For branch intensive tasks, the efficiency of execution is limited by this "branch penalty."

Some processors attempt to overcome this branch penalty by scheduling branches in advance wherever possible. For example, instructions that are not dependent upon the outcome of the branch are inserted between the instruction that determines the branch target direction and the first instruction at that target. However, branch intensive tasks are not well served by this approach, because they typically do not have sufficient work to fill in the gaps in execution created by the branches.

Other processors attempt to predict which direction a conditional branch will take and fetch the instruction for the predicted direction before that prediction can be confirmed. If the prediction is correct, the penalty is avoided. If the prediction is incorrect, the penalty is still incurred. Moreover, sometimes the penalty is larger for a misprediction due to the need to back out of the wrong path. Branch prediction relies on the fact that certain conditional branches, like loop termination branches, are much more likely to take one direction than the other. Tasks, like network packet parsing, with many branches for which both branch directions are often of nearly equally likelihood are not well served by branch prediction.

In early systems, two levels of code were used to operate the system. A program would be written in machine language which is then executed by the computer by executing a separate microcode program for each instruction. These types of systems used wide instruction words to allow for parallel processing and explicit control of branches. These systems also had a writeable control store to allow a programmer to create his or her own routines in microcode for faster processing. There is a certain inefficiency in linking all the separate machine language instructions together that could be overcome by bypassing the machine language entirely and writing an entire function in microcode. Some of these systems may operate to specify two different next addresses and then perform a test, choose one of those addresses, and then fetch the next word. In these systems, the technology was such that cycles were long enough that this method gave a reasonably high performance.

BRIEF SUMMARY OF THE INVENTION

One embodiment of the present invention is directed to a system that comprises a first memory for storing a first plurality of words, a second memory for storing a second plurality of words, a register for storing a current word, wherein the current word comprises a first address of a next possible word from the first memory and a second address of a next possible word from the second memory, and a multiplexer that selects one of the next possible word from the first memory and the next possible word from the second memory to be the next current word during a time period. Wherein, the next possible word corresponding to the first address and the next possible word corresponding to the second address are provided to the multiplexer during the time period.

Another embodiment of the present invention is directed to a method that comprises storing a first word in a computer readable register during a first time period, retrieving a second word from a first computer readable memory during a second time period based on the first word, retrieving a third word from a second computer readable memory during the second time period based on the first word, and executing the first word to determine which of the second word and the third word will be subsequently stored in the computer readable register during the second time period.

A further embodiment of the present invention is directed to a data structure that is stored in a computer readable memory that is operative to control a plurality of execution units to manage packets in a network. The data structure comprises a first address of a first next possible data structure that is stored in a first memory, a second address of a second next possible data structure that is stored in a second memory, and encoding used to select the next data structure from the first next possible data structure and the second next possible data structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
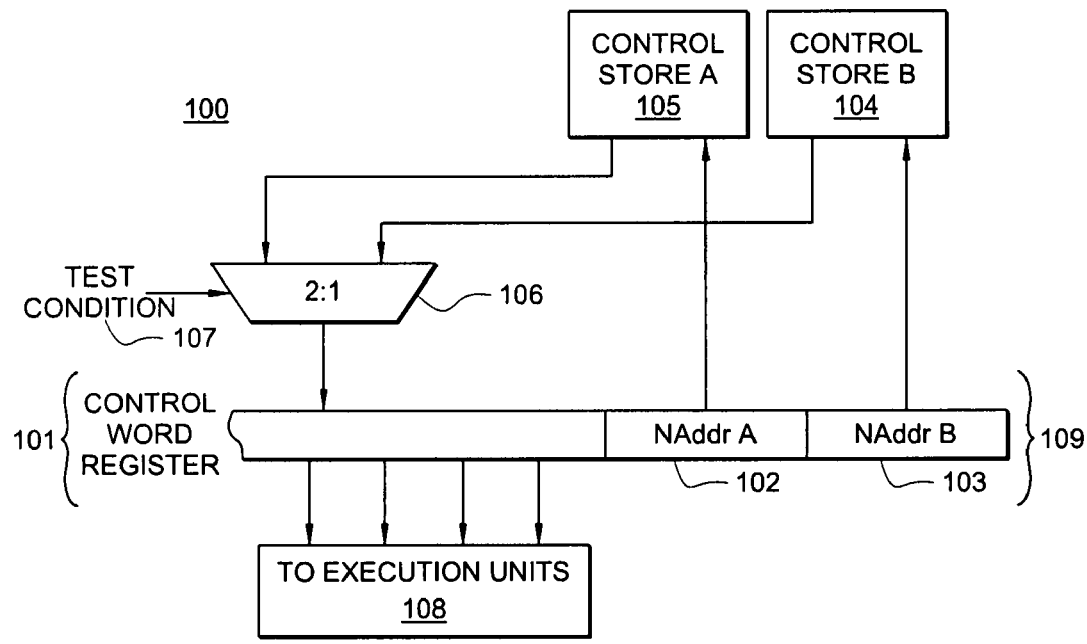
FIG. 1 is a schematic view of an example of a micro-engine according to embodiments of the invention.

Embodiments involve a plurality of logical and arithmetic elements, register files, input and output paths, and control flow mechanisms that are controlled by a wide or horizontally micro-coded control word that comprises control bits for some or each of these components. The control word is received into a register, control word register, at the end of one clock cycle. The outputs of the register control the processing resources in the immediately following cycle. A sequence of such control words, loaded into the control word register one after the other in successive clock cycles, form a program that performs a complex task, such as network packet parsing. The program may execute at a rate of one control word per cycle.

Conditional branches are performed by selecting one of two possible next control words as a result of the operations performed by the current control word. To avoid incurring a penalty when performing a conditional branch, both of the possible next target control words are accessed from memory or control store in parallel, before it can be determined which of these words will actually be executed. The two fetched control words are fed to a 2:1 multiplexer and the result of a test performed on or by the current control word is applied to the select input of the multiplexer to determine which of the two next control words will be loaded into the control word register to control operations in the subsequent cycle.

Instruction sequencing in this particular embodiment may not use a program counter and does not assume that certain sequences of successively executed control words are contiguous in memory. Instead, each of the two possible next control words are explicitly addressed in the current control word. Note that the two control stores may contain entirely different control words, thus there is no need to replicate the individual control words.

Embodiments reduce or eliminate the branch penalty that would be incurred by first deciding which next control word to fetch and then fetching that one control word alone from a single control store. For branch intensive tasks, namely those that require a branch to be performed in almost every cycle, this can result in close to a doubling of the performance obtained by a given set of processing resources, if not more. Further note that embodiments do not involve prediction but rather are deterministic in operation. Thus, zero branch penalty operations are possible with the embodiments.

Embodiments may be also involve more than two words. For example a packet may have three possible next words addresses, and all three of the possible next target control words are accessed from memory in parallel. The three fetched control words are fed to a 3:1 multiplexer and the results of one or more tests performed on or by the current control word are applied to the select input of the multiplexer to determine which of the three next control words will be loaded into the control word register to control operations in the subsequent cycle. For example, in one implementation, a first test may be used to select address A or B, and an entirely separate test is used to select between address C and the outcome of the first selection. Other embodiments may involve more than three words.

FIG. 1 depicts a schematic view of an example of a micro-engine 100 according to embodiments of the invention. Micro-engine 100 is a horizontally programmed micro-engine that is capable of performing a branch in every cycle without stalling. Horizontally programmed means that the instructions comprise relatively wide control words, for example 128 bits. Each bit or bit field may have its own dedicated function. These control words direct multiple execution units 108 in parallel with one another to perform the entire task in the time allotted.

Micro-engine 100 comprises two different control stores, namely control store A 105 and control store B 104, and a control word register 101. Store A and store B are memories, e.g. RAMs, that contain all of the control words that can be used. The register 101 stores the current control word 109. The control word register 101 sources an assortment of signals that directly control the various elements of the micro-engine with little or no need for intermediate decoding. Each control word 109 specifies two possible next control words by address, namely next address A 102 and next address B 103. Both of these possible next control words are fetched from store A 104 and store B 105, even though only one will be used in the next cycle.

Micro-engine 100 also comprises multiplexer (MUX) 106. The inputs to MUX 106 are the two possible next control words in store A 104 and store B 105. Test condition 107 is used to select between the two control words. The test condition 107 may comprise a command to select one of the words unconditionally, command to select one of the words based on a logic operation of the current word, command to select one of the words based on an arithmetic operation of the current word, command to select one of the words based on a predicate, or a command to select one of the words based on combinations thereof. The test condition may involve the current word, prior word(s), or other test condition. The selected word is then loaded into the control word register 101 for execution. The next possible addresses that are referenced in the control word are then fetched and the operations repeat. Note that embodiments do not involve a program counter as each control word may be explicitly identified by its full address.

Figure 2:
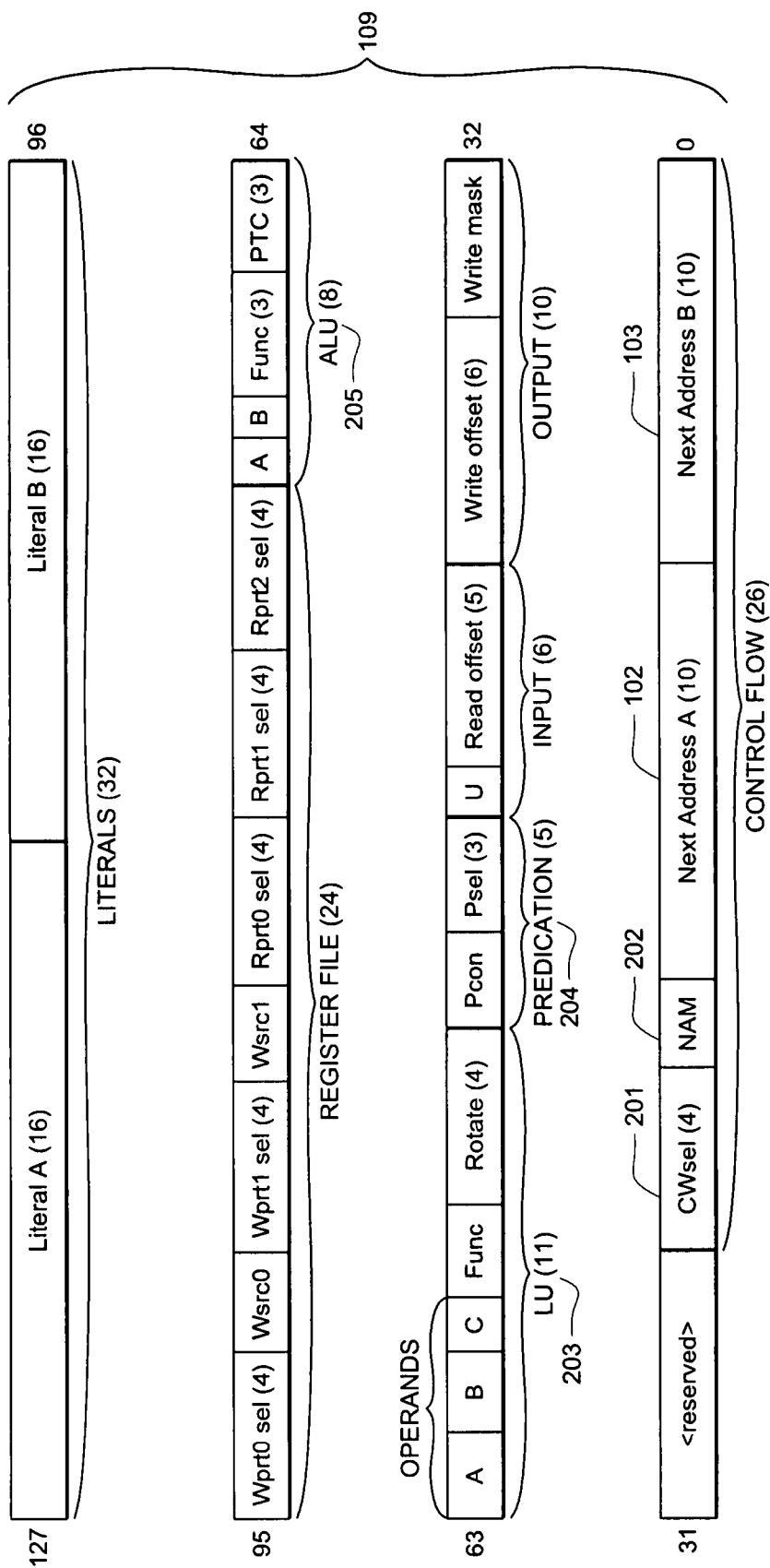
FIG. 2 depicts an example of a format for a control word according to embodiments of the invention.

FIG. 2 depicts an example of a format 109 for a control word according to embodiments of the invention. Note that this format 109 is by way of example only. A word may comprise more or fewer bits, and may comprise more or fewer fields, and may comprise the fields arranged differently and comprise different numbers of bits. The format 109 includes next address A 102 and next address B 103. The format includes control word select portion 201 which is used to control the MUX 106. The format also includes next address modification portion (NAM) 202 which allows for the next address fields 102, 103 to be modified. For example, these bits may allow for the substitution of bits in the address(es). Logic unit portion 203, and arithmetic logic unit portion 205 control the operations of execution units 108. Predication portion 204 allows operations to be contingent upon the outcomes of prior actions. The remaining portions of the format comprise other control bits and data bits.

Figure 3:
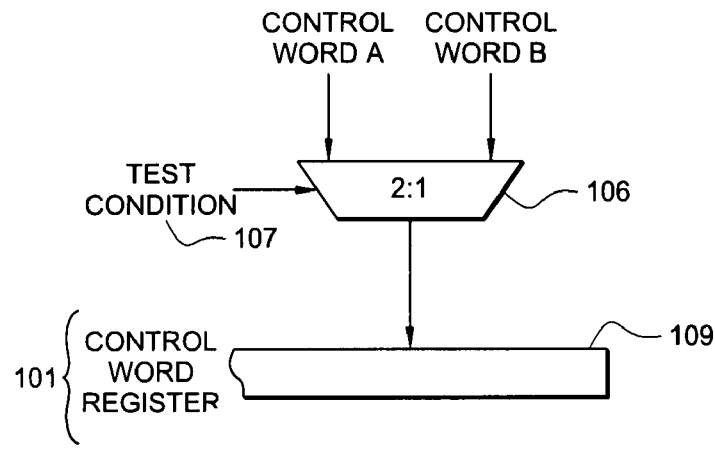
FIG. 3 depicts a schematic diagram of the MUX of FIG. 1 and an example of encodings used to control the MUX according to embodiments of the invention.

FIG. 3 depicts a schematic diagram of the MUX of FIG. 1 and an example of encodings used to control the MUX according to embodiments of the invention. Note that the encodings are by way of example only, as there can be more or fewer encodings, the encodings may comprise different commands, and can be arranged in a different order. The current word 109 comprises control word select portion 201. The bits of this portion are used to select which of the two control words will be loaded into the register 101. Control word selection or branching chooses between two possible next control words in each cycle, based on criteria determined by the current control word and/or the results of operations performed in the current cycle.

The selection may be unconditional. For example, true indicates that word A is selected and false indicates that word B is selected.

The selection may be conditional. For example, selection may depend upon the results of an ALU operation (or its inverse), an LU operation (or its inverse), or combinations thereof. For example, a logical OR of the ALU operation and the LU operation (or the inverse), or a logical AND of the ALU operation and the LU operation (or the inverse).

The selection may be conditional based upon one or more predicates. Predication is another control flow mechanism that allows certain operations to be contingent upon the outcome of prior actions, without requiring a branch to a different control path. Thus, predicates are the saved results of earlier operations, e.g. LU or ALU operations, that are saved for future use.

The current word 109 of FIG. 2 also comprises next address modification portion (NAM) 202 which provides instructions for modifying one or both the next address fields 102, 103. NAM extends the control word selection function by allowing data dependent manipulation of the addresses used to access the two possible next control words. For example, the entire address of a next address may be substituted. A literal can be saved in a register and used later as an address to assure return of control to a pre-selected location. Note that any value that can be generated by the LU or ALU can be used for this purpose. Another option is to allow for substitution for a portion of the address of the next address. This would allow for transfer of control to any one of a number of locations within a constrained region. Thus, the NAM portion is useful as a multi-way dispatch for decoding fields that can have many valid encodings. Dispatching allows for a reduction in the number of tests or conditions that may need to be done in order to route a packet. Logically combining bits may provide a signature of the address, in effect a mapping of a larger number of bits to a smaller number of bits. This would reduce the possible destinations of the packet and thus a reduction in the number of branches that would need to be performed. For example, consider that an eight bit field from the packet may require checking to identify which of 12 different possible values might be present in that field. (Note that more values are possible, e.g. 256 for an eight bit field.) By forming a three bit hash based on that eight bit field and then using that to dispatch to one of eight different control words, the number of tests can be reduced. Each of the 12 values that must be detected will map to just one of the eight hash values. Ideally, the hash will be selected to create a reasonably even distribution, such that tests for only one or two of the original 12 values will be required after completing the dispatch.

Figure 4:
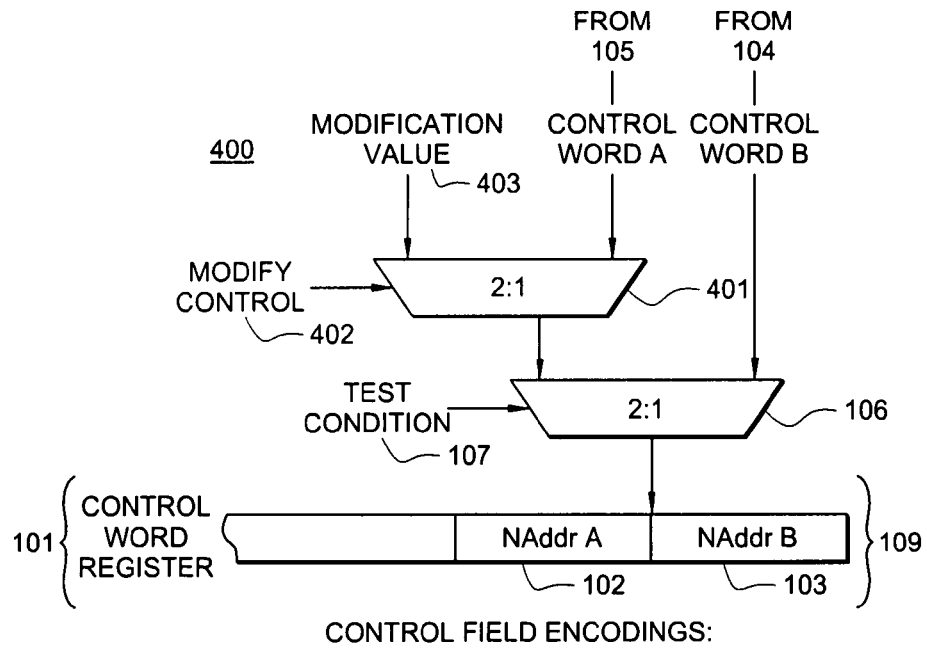
FIG. 4 depicts a schematic view of an alternative example of the micro-engine of FIG. 1, according to embodiments of the invention.

FIG. 4 depicts a schematic view of an alternative example 400 of the micro-engine of FIG. 1, according to embodiments of the invention. The micro-engine of FIG. 4 includes NAM MUX 401 which is located between the control store A 105 and MUX 106. NAM MUX 401 allows for a modification value 403 to be provided to MUX 106 in place of all or a portion of the control word from control store A. Thus, the modification value may be interposed for a select few control word bits and not the entire control word. Note that NAM MUX 401 may be used to modify the control word from control store B instead of the word from control store A. Also note that the embodiment of FIG. 4 may include another NAM MUX that is used to modify the control word from control store B.

The NAM MUX is controlled by modify control value 402. FIG. 4 depicts an example of the encodings used to control NAM MUX 401. Note that the encodings are by way of example only, as there can be more or fewer encodings, the encodings may comprise different commands, and can be arranged in a different order. The current word 109 comprises NAM portion 202. The bits of this portion are used to select the modifications that may occur to the word of control store A. For example, there may be no modification to the word of store A, or the register dispatch of the lower bits of an execution unit 108, e.g. a logical unit (LU), may be substituted for one of the next addresses in the word, e.g. next address A 102. The modification may also comprise a two bit hash value from an execution unit 108, e.g. a LU, which may be substituted for a portion of one of the next addresses, e.g. the lower 2 bits of next address B 103. The modification may also comprise a three bit hash value from an execution unit 108, e.g. a LU, which may be substituted for a portion of one of the next addresses, e.g. the lower 3 bits of next address B 103. Thus, the NAM portion and the NAM MUX allow for dynamic modification of the words rather than only statically using the words themselves.

The NAM register dispatch function can be used to perform a "return-from-subroutine" operation. A literal value in the calling code can be saved in a register before branching to shared code, then used to return to the desired point. Also, two hash functions may be used to implement a form of multi-way branch for decoding certain packet fields, e.g. ETYPE (Ether type field in an Ethernet packet). Two distinct hash functions can be performed on a potentially masked and rotated 16 bit value. One function produces a 2 bit result for a 4-way dispatch meaning that control is sent to one of four addresses, and the other a 3 bit result for an 8-way dispatch meaning that control is sent to one of eight addresses. If needed, back-to-back cycles can combine two consecutive hash operations to provide 16, 32, or 64-way dispatch. Possibilities include using each of the two functions once or using either function twice, with different rotations, on the same value, or using the functions on two different 16 bit values to dispatch from a 32-bit (or larger) field. Note that the NAM function can be used to perform other operations and the return-from-subroutine operation is by way of example only.

Figure 5:
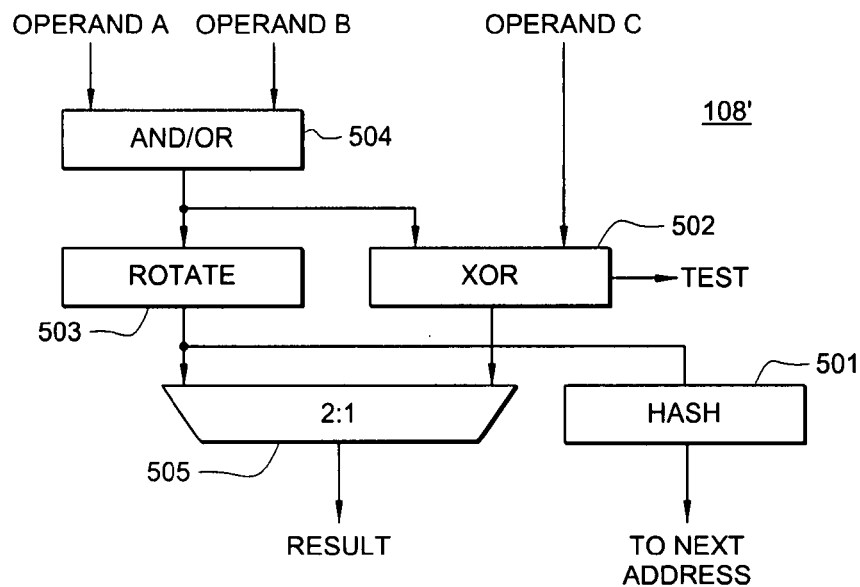
FIG. 5 depicts an example of an arrangement of an execution unit of FIGS. 1 and 4, according to embodiments of the invention.

FIG. 5 depicts an example of an arrangement of an execution unit of FIGS. 1 and 4, according to embodiments of the invention. The execution unit of FIG. 5 is a logical unit (LU) 108'. This LU provides the hash function 501 used in the NAM operations of FIG. 4. Note that this arrangement is by way of example only as other arrangements could be used to provide the hash function.

The hash function limits the number of bits that must be modified in the next address field to get a useful result and hence limits the number of control words that are used. The hash function used in NAM modification is attached to the LU. This allows it to share the mask and rotate 503 capabilities of that unit. The mask capabilities are provided by the AND/OR function 504. Typically, a masking function will involve having a mask value that includes logical 1s in bit positions where data is to be retained and logical 0s in bit positions where data is to be removed. This mask is then logically ANDed with the data to mask off the bits that are not wanted. Masking eliminates bits that are not part of the field being decoded. Rotation provides more options for finding the best distribution for a given hash function. One useful hash may be taking the parity of several bit groups within the input value. The operands A and B may serve as the mask value and the value to be masked. For example, one operand may be 16 contiguous bits taken from the packet data and the other a 16 bit literal from the control word that will be used as a mask value to select just eight bits of the packet data bits to be applied to the hash function. The ability to rotate these bits before passing them to the hash logic provides some control over how the hash behaves. This allows the system to find a more reasonably even distribution. In other variations, the same data path might be used to feed a literal value to be used in place of the entire address. In that case, it is likely that the masking, rotating, and hashing functions would not be used, but would be set up to pass the data through without modifying it. The XOR function 402 and the multiplexer 505 are part of the general capabilities of the LU. Operand C provides an input into the XOR unit. The output of the LU would be selected by MUX 505.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a first memory for storing a first plurality of words;
a second memory for storing a second plurality of words;
a register for storing a current word, wherein the current word comprises a first address of a next possible word from the first memory and a second address of a next possible word from the second memory; and
a multiplexer that selects one of the next possible word from the first memory and the next possible word from the second memory to be a next current word during a time period;
wherein the next possible word corresponding to the first address and the next possible word corresponding to the second address are provided to the multiplexer during the time period.

2. The system of claim 1, wherein the multiplexer uses a test result to select the next current word.

3. The system of claim 2, wherein the current word further comprises an encoding that directs the test to from the test result.

4. The system of claim 3, wherein the encoding comprises one of:
a command to unconditionally select one of the next possible word from the first memory and the next possible word from the second memory to be the next current word; and
a command to conditionally select one of the next possible word from the first memory and the next possible word from the second memory to be the next current word.

5. The system of claim 4, wherein the a command to conditionally select one of the next possible word from the first memory and the next possible word from the second memory to be the next current word is based on one of:
(a) an operation of an arithmetic unit using a portion of the current word;
(b) an operation of logical unit using a portion of the current word;
(c) a logical AND of an operation of the arithmetic unit using a portion of the current word and an operation of logical unit using a portion of the current word;
(d) a logical OR of an operation of the arithmetic unit using a portion of the current word and an operation of logical unit using a portion of the current word;
(e) an inverse of (a), (b), (c), or (d); and
(f) a predication using a portion of the current word.

6. The system of claim 1, further comprising:
an execution unit that receives a portion of the current word and performs an operation based on the portion.

7. The system of claim 6, wherein the execution unit comprises one of:
a logical unit, and an arithmetic unit.

8. The system of claim 6, wherein the execution unit performs a hash function.

9. The system of claim 1, wherein the current word further comprises:
an encoding for modifying the next current word.

10. The system of claim 9, wherein the encoding defines one of:
no modification, replacing one of the first address and the second address with another address, and replacing a portion of one of the first address and the second address with another portion.

11. The system of claim 9, wherein the encoding defines one of:
a register dispatch, and a hash value.

12. The system of claim 1, wherein the system handles packets in a network.

13. The system of claim 1, wherein the first plurality of words is the same as the second plurality of words.

14. The system of claim 1, wherein the first plurality of words is different from the second plurality of words.

15. The system of claim 1, wherein the system is a horizontally programmed micro-engine.

16. The system of claim 1, wherein the time period is one cycle.

17. A method comprising:
storing a first word in a computer readable register during a first time period, wherein the first word comprises a first address of a first next possible word from a first computer readable memory and a second address of a second next possible word from a second computer readable memory;

retrieving the first next possible word from the first computer readable memory during a second time period based on the first address;

retrieving the second next possible word from the second computer readable memory during the second time period based on the second address; and executing the first word to determine which of the first next possible word and the second next possible word will be subsequently stored in the computer readable register during the second time period.

18. The method of claim 17, further comprising:

repeating the storing the first word, the retrieving the first next possible word, retrieving the second next possible word, and the executing the first word to handle packets in a network.

19. A non-transitory computer readable storage medium on which is embedded a data structure operative to control a plurality of execution units to manage packets in a network, said data structure comprising a set of instructions to:

store a first word in a computer readable register during a first time period, wherein the first word comprises a first address of a first next possible word from a first computer readable memory and a second address of a second next possible word from a second computer readable memory, wherein the second computer readable memory is separate from the first computer readable memory;

retrieve the first next possible word from the first computer readable memory during a second time period based on the first address;

retrieve the second next possible word from the second computer readable memory during the second time period based on the second address; and execute the first word to determine which of the first next possible word and the second next possible word will be subsequently stored in the computer readable resister during the second time period.

20. The non-transitory computer readable storage medium of claim 19, wherein the data structure is to be executed by a horizontally programmed micro-engine.

* * * * *

UNITED STATES PATENT AND TRADEMARK OFFICE
CERTIFICATE OF CORRECTION

| | |
|---|---|
| PATENT NO. | : 8,046,569 B2 |
| APPLICATION NO. | : 11/796810 |
| DATED | : October 25, 2011 |
| INVENTOR(S) | : Michael L. Ziegler |

It is certified that error appears in the above-identified patent and that said Letters Patent is hereby corrected as shown below:

In column 8, line 2, in Claim 3, delete "to from" and insert -- to --, therefor.

In column 8, line 14, in Claim 5, delete "the a" and insert -- the --, therefor.

Signed and Sealed this
Sixteenth Day of October, 2012

David J. Kappos
*Director of the United States Patent and Trademark Office*